(12) United States Patent
Dickinson et al.

(10) Patent No.: US 11,034,260 B2
(45) Date of Patent: Jun. 15, 2021

(54) SYSTEM MONITORING POWER CONNECTOR AND CABLE HEALTH

(71) Applicant: AEROVIRONMENT, INC., Simi Valley, CA (US)

(72) Inventors: Blake Edward Dickinson, Monrovia, CA (US); Bradford M. Hori, Monrovia, CA (US); Daniel D. Dresselhaus, Azusa, CA (US)

(73) Assignee: WEBASTO CHARGING SYSTEMS, INC., Simi Valley, CA (US)

( * ) Notice: Subject to any disclaimer, the term of this patent is extended or adjusted under 35 U.S.C. 154(b) by 1126 days.

(21) Appl. No.: 15/078,304

(22) Filed: Mar. 23, 2016

(65) Prior Publication Data

US 2016/0339786 A1 Nov. 24, 2016

Related U.S. Application Data

(60) Provisional application No. 62/137,115, filed on Mar. 23, 2015.

(51) Int. Cl.
| | |
|---|---|
| *H02J 7/00* | (2006.01) |
| *B60L 58/24* | (2019.01) |
| *H02H 5/04* | (2006.01) |
| *B60L 3/04* | (2006.01) |
| *H02H 3/08* | (2006.01) |
| *B60L 53/18* | (2019.01) |
| *B60L 53/16* | (2019.01) |
| *G08B 21/18* | (2006.01) |

(52) U.S. Cl.
CPC .............. *B60L 58/24* (2019.02); *B60L 3/04* (2013.01); *B60L 53/16* (2019.02); *B60L 53/18* (2019.02); *G08B 21/182* (2013.01); *H02H 3/085* (2013.01); *H02H 5/042* (2013.01); *H02J 7/0026* (2013.01); *B60L 2200/42* (2013.01); *B60L 2240/36* (2013.01); *Y02T 10/70* (2013.01); *Y02T 10/7072* (2013.01); *Y02T 90/12* (2013.01); *Y02T 90/14* (2013.01)

(58) Field of Classification Search
CPC ........................................................ H02J 7/027
USPC ......................................... 320/109, 150–154
See application file for complete search history.

(56) References Cited

U.S. PATENT DOCUMENTS

| | | | | |
|---|---|---|---|---|
| 5,600,306 | A * | 2/1997 | Ichikawa | ........... H01R 13/6683 337/1 |
| 2002/0081486 | A1 | 6/2002 | Williams | |

(Continued)

OTHER PUBLICATIONS

International Search Report for Serial No. PCT/US16/23733 dated Jul. 15, 2016.

*Primary Examiner* — Arun C Williams
(74) *Attorney, Agent, or Firm* — Concept IP LLP; Michael Zarrabian

(57) ABSTRACT

A method of protecting an electric vehicle (EV) charger connector from excessive heat includes monitoring the internal temperature of an electrical connector, the electrical connector having pilot and pilot return signal lines, reducing a voltage between the pilot and pilot return signal lines in response to the internal temperature exceeding a first threshold, and reducing charging current provided through the electrical connector in response to the change in voltage so that the internal temperature exceeding the first threshold will result in a reduction of charging current through the connector.

20 Claims, 5 Drawing Sheets

(56) References Cited

U.S. PATENT DOCUMENTS

| | | | | |
|---|---|---|---|---|
| 2006/0103357 | A1* | 5/2006 | Johnson | B25F 5/02 320/150 |
| 2006/0225449 | A1* | 10/2006 | Dorrich | H05K 7/20572 62/259.2 |
| 2009/0167537 | A1* | 7/2009 | Feliss | B60L 3/0069 340/584 |
| 2011/0172839 | A1* | 7/2011 | Brown | B60L 3/0069 700/292 |
| 2012/0249066 | A1* | 10/2012 | Ichikawa | B60K 6/445 320/109 |
| 2013/0201641 | A1* | 8/2013 | Soden | B60L 3/04 361/752 |
| 2013/0335024 | A1* | 12/2013 | Akai | H01M 10/44 320/109 |
| 2014/0002022 | A1* | 1/2014 | Choi | H02J 7/027 320/109 |
| 2014/0026830 | A1* | 1/2014 | Wikstrom | F01P 7/16 123/41.1 |
| 2014/0035527 | A1* | 2/2014 | Hayashigawa | B60L 53/305 320/109 |
| 2014/0049218 | A1* | 2/2014 | Morand | H02J 7/04 320/109 |
| 2014/0211345 | A1* | 7/2014 | Thompson | B60L 11/1816 361/42 |
| 2015/0028809 | A1* | 1/2015 | Nishikawa | H02J 7/0088 320/109 |
| 2015/0303737 | A1* | 10/2015 | Steinbuchel, IV | B60L 3/0069 320/109 |
| 2016/0075244 | A1* | 3/2016 | Im | H01R 13/7137 320/107 |
| 2016/0107530 | A1* | 4/2016 | Roberts | B60L 11/1818 320/109 |
| 2016/0137079 | A1* | 5/2016 | Jefferies | B60L 11/1816 320/109 |
| 2016/0138980 | A1* | 5/2016 | Jefferies | G01K 7/16 374/141 |

* cited by examiner

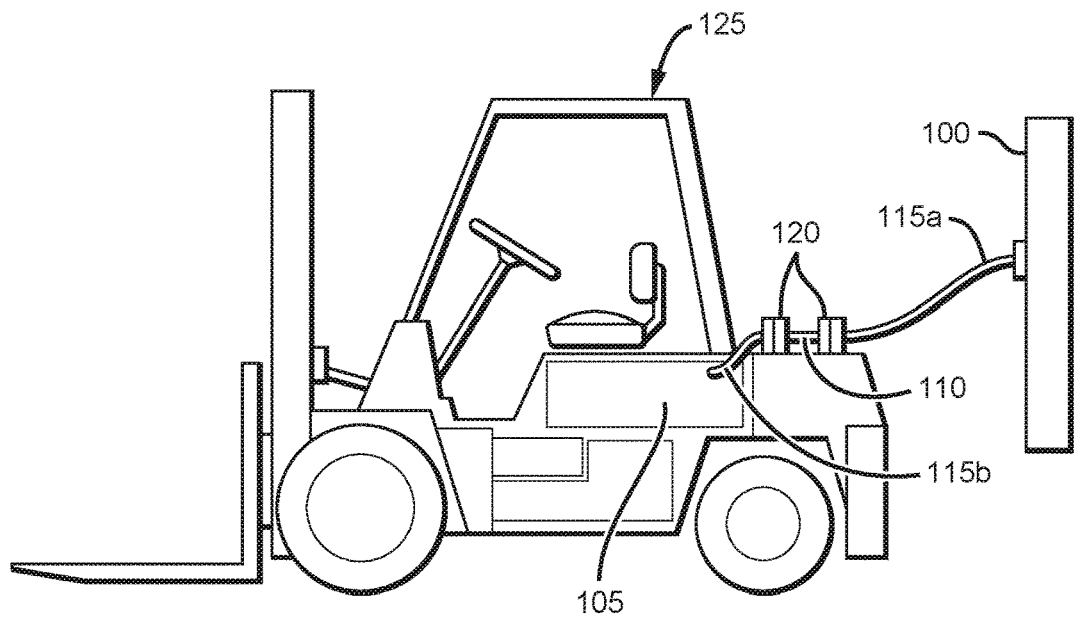
FIG. 1
FIG. 2
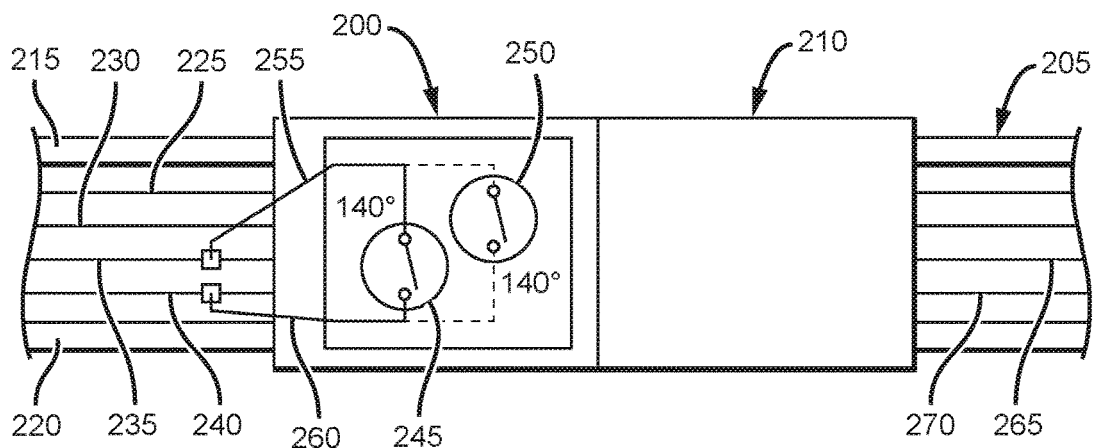
FIG. 3
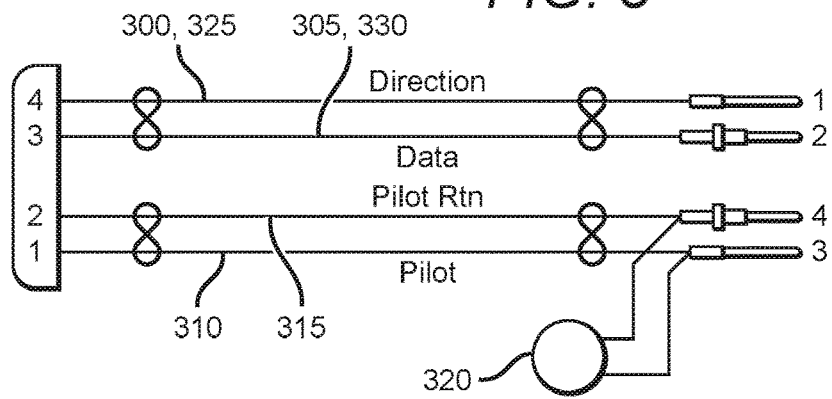

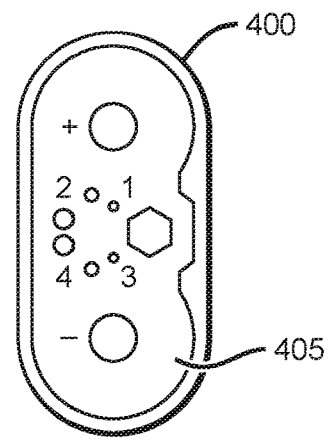
FIG. 4
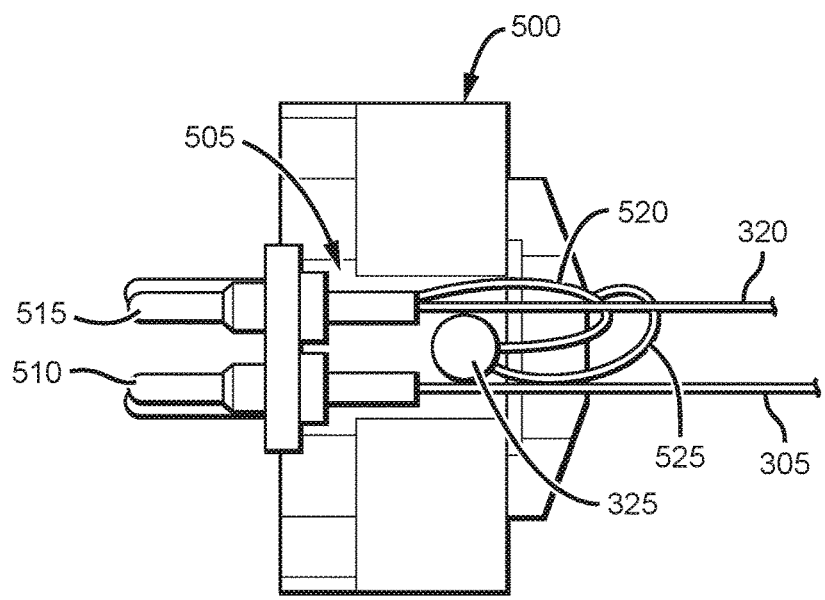
FIG. 5
FIG. 6
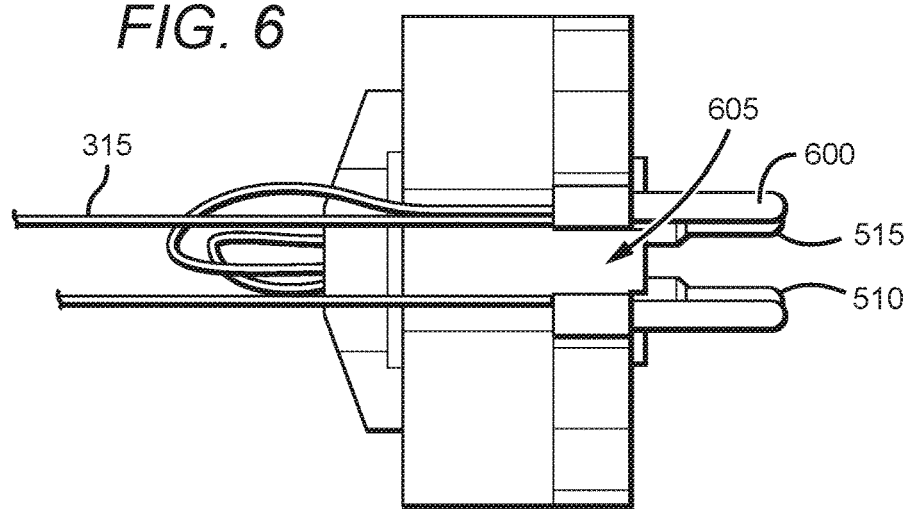

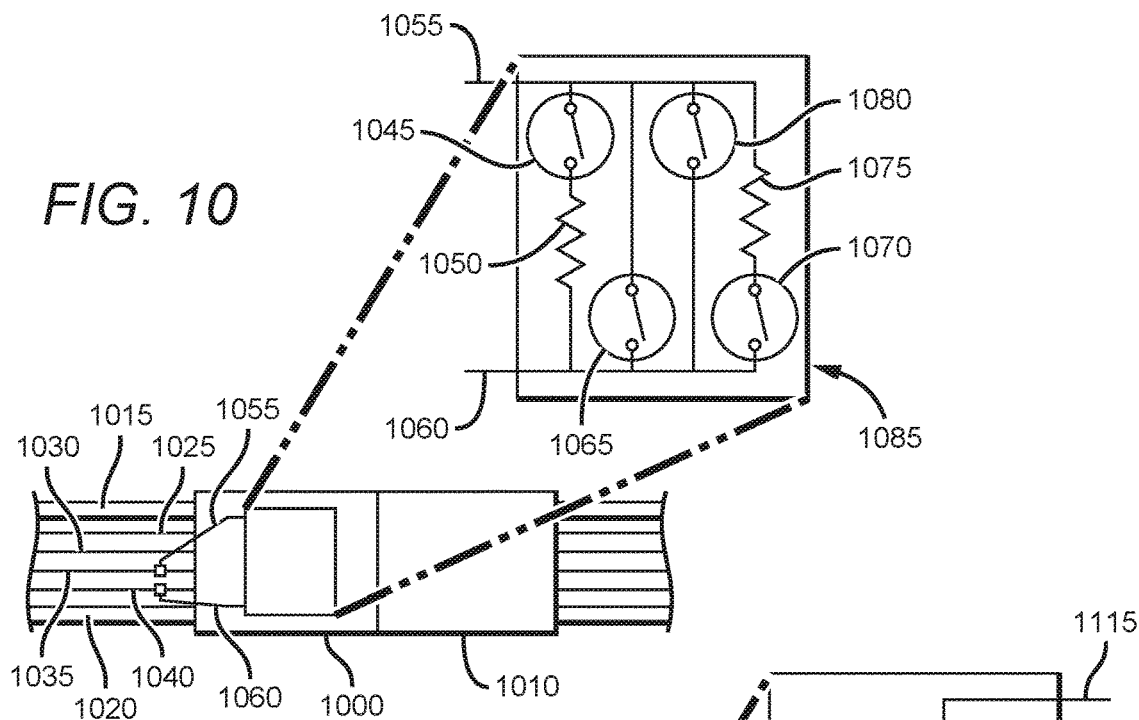
FIG. 10
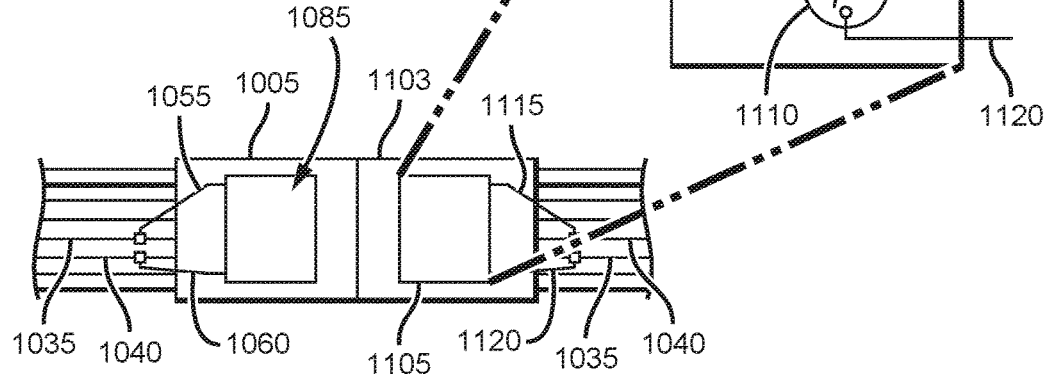
FIG. 11
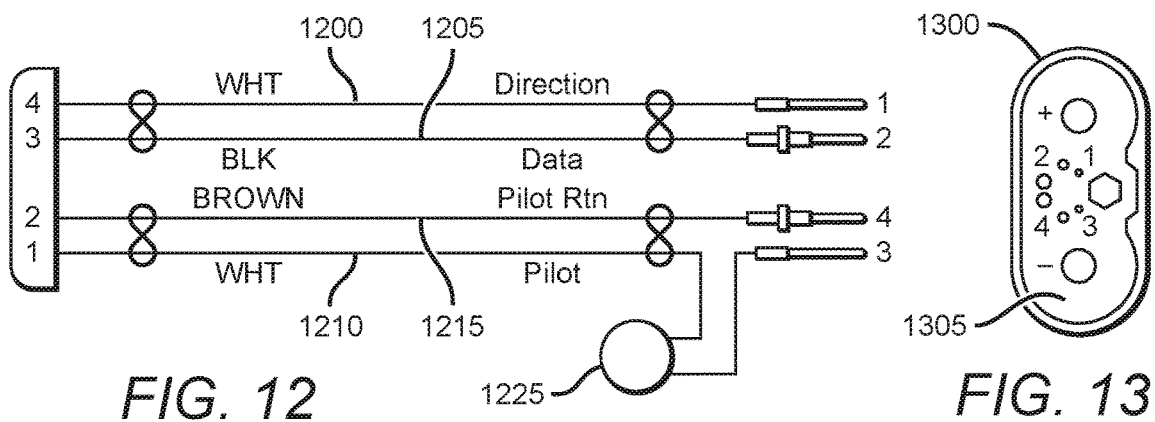
FIG. 12
FIG. 13

SYSTEM MONITORING POWER CONNECTOR AND CABLE HEALTH

CROSS-REFERENCE TO RELATED APPLICATIONS

This application claims benefit of provisional application No. 62/137,115, filed Mar. 23, 2015, which is hereby incorporated by reference for all purposes.

BACKGROUND

Field of the Invention

The field of the invention relates to electric vehicle charging cables, and more particularly systems for detecting faults in electric vehicle charging cables.

Description of the Related Art

A typical electric vehicle (EV) charger 100 may be connected to an EV battery 105 through an adapter cable 110, with each of the EV charger 100 and EV battery 105 having respective cabling (115a, 115b). Electrical connectors 120 are used to electrically and detachably connect the cabling together (see FIG. 1). The cables (115a, 115b) will typically have positive and negative power lines, a pair of communication lines and a pair of pilot lines (lines not shown). Electrical continuity of the pilot lines between the charger 100, to the battery 105, and back to the charger 100 may be used for suitable control of power provided to the EV 125 through the power lines (line cables not shown).

Unfortunately, pins and sockets (collectively referred to as "contacts") and other electrical couplings within the connectors 120 can degrade or become damaged during repetitive use and so may produce damaging excess heat when current is provided through them. If the excessive heat is not detected, the connectors may deform or melt, thus allowing the electrical couplings to short. This may result in catastrophic connector failure, an associated battery fire and loss of the EV 125 housing the battery 105. A need continues to exist to reduce the possibility of catastrophic failure of EV charging connectors and associated fires.

SUMMARY

A method of protecting an EV charger connector from excessive heat includes monitoring the internal temperature of an electrical connector, the electrical connector having pilot and pilot return signal lines, reducing a voltage between the pilot and pilot return signal lines in response to the internal temperature exceeding a first threshold, reducing charging current provided through the electrical connector in response to the change in voltage, so that internal temperature exceeding the first threshold will result in a reduction of charging current through the connector. The step of reducing charging current may include ceasing the charging current. The step of changing the voltage between the pilot and pilot return signal lines may include electrically shorting the pilot and pilot return lines together, and the shorting may be in response to a thermostat closing. The method may also include opening a switch that is electrically connected in series with either one of the pilot line or pilot return line. The switch may be a normally-open thermostat. The method may also include further reducing the voltage between the pilot and pilot return signal lines in response to the internal temperature exceeding a second threshold. The further reducing step may include electrically shorting the pilot and pilot return lines together. The further reducing step may also include opening a switch disposed in series with one of the pilot and pilot return lines. In one embodiment, the exceeding the threshold temperature step results from an electrical short causing excess heat.

A method of protecting an EV charger connector from excessive heat includes monitoring the internal temperature of an electrical connector, the electrical connector housing a pilot line, pilot return signal line, and first and second power lines, switching on an over-temperature alarm circuit connected between the first and second power lines in response to the temperature exceeding a first threshold so that the internal temperature exceeding the first threshold will result in an alarm indication. The switching step may include tripping a thermostat. The over-temperature alarm circuit may include an LED light encompassed by the electrical connector. The over-temperature alarm circuit may include a buzzer or alarm transmitter.

A battery temperature monitoring apparatus may include first and second pilot lines in an electrical connector, first and second power lines in the electrical connector, and a thermostat electrically coupled to at least one of the first pilot line, second pilot line, first power line and second power line and disposed in the electrical connector. Thermostat is electrically coupled between the first and second pilot lines. The thermostat may be a normally-open thermostat and triggering of the thermostat at a pre-determined temperature results in an electrical short between the first and second pilot lines. The apparatus may also include a resistor connected in series with the thermostat so that triggering of the thermostat at a pre-determined temperature reduces the voltage between the first and second pilot lines. The thermostat may be connected in series with one of first and second pilot lines and the thermostat is a normally-closed thermostat. The thermostat may be disposed adjacent to connector contacts. The system may include an excessive heat alarm. The thermostat may be electrically coupled between the first and second power lines and the thermostat may be a normally-open thermostat. The apparatus may also include a thermal alarm connected in series with the thermostat so that closing of the thermostat at a predetermined temperature results in activation of the thermal alarm as powered by the first and second power lines. The system may also include a second thermostat electrically coupled between the first and second pilot lines and configured to close at a second predetermined temperature. Power to at least one of the first and second power lines may be switched off in response to closing of the second thermostat across the first and second pilot lines.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 1 is a prior art diagram of an electric forklift being charged by a battery charger;

FIG. 2 is a block diagram and schematic of one embodiment of a thermostat connected between pilot and pilots return lines to provide an over-temperature indication to a battery charger or battery monitor;

FIGS. 3 and 4 are schematic diagram and front connector plan views, respectively, illustrating one embodiment of a thermostat electrically coupled between communication and pilot lines and associated line pin-outs;

FIGS. 5 and 6 are top and bottom plan reviews, respectively, of one embodiment of a partially assembled connector showing physical placement and electrical connection of the thermostat depicted in FIGS. 3 and 4;

FIG. 10 is a block diagram and schematic of one embodiment of a connector having multiple thermostats between pilot and pilots return lines to provide stepped responses to an over-temperature condition in the electrical connector;

FIG. 11 is a block diagram and schematic illustrating use of the first connector thermostat first illustrated in FIG. 10, and with a second thermostat disposed in an adjacent mating connector;

FIGS. 12 and 13 are schematic diagram and front connector plan views, respectively, illustrating a normally-closed thermostat in series with a pilot line;

DETAILED DESCRIPTION

Figure 7:
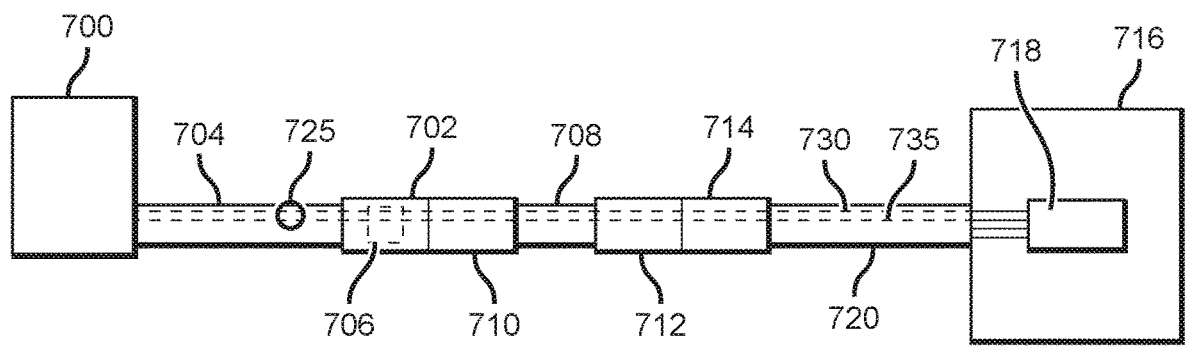
FIG. 7 is a block diagram of a battery charger electrically coupled to a battery monitor and battery, and with a thermostat in a connector of the battery charger cable assembly.

A system is disclosed that may be used to identify and mitigate excessive heat in connectors used to charge electric vehicles (EVs) in order to reduce the possibility of catastrophic failure of such connectors and associated battery fires. A thermostat disposed in the electrical connector is electrically coupled to at least one of a pilot line, pilot return line, first power line and second power line that extend into the electrical connector. With the thermostat disposed adjacent to the connector's contacts, excessive heat in the connector or its associated mating connector may be detected and an excessive heat warning provided to a user, a reduction or cessation of power request signal provided to the associated EV charger (in the form of a reduced pilot level or a pilot line break), or some combination of the above, in response to the detected excessive heat. For example, excess heat generated from faulty contacts of the connector or its mating connector may be detected by the thermostat, and the thermostat may trigger a reduction in voltage between the pilot and pilot return line voltages to prompt an associated EV charger to switch off power to the faulty contacts. In other embodiments, the thermostat may trigger a thermal alarm that is powered by the power lines in the connector to warn a user of excessive heat in the connector. Multiple thermostats in the connector may be used to first generate a warning to a user at a first predetermined temperature, and then to prompt switching off of power to the connector at a second higher pre-determined temperature. In any case, excessive heat in the connector or its mating connector may be detected by the thermostat so that mitigating steps may be taken to avoid catastrophic connector failure, associated battery fire and loss of the EV housing the battery.

FIG. 2 is a block diagram and schematic of one embodiment of a temperature sensor circuit (alternatively referred to as a "thermostat") connected between pilot and pilots return lines and positioned in adjacent connector contacts. A first electrical connector 200, such as a charger cable connector configured as a male euro connector, may be coupled to a second electrical connector 210, such as an adapter cable connector configured as a female euro connector on a euro-to-SB350 adapter cable 205. First and second power lines (215, 220) extend into the charger cable electrical connector 210 for electrical connection to respective power contacts (not shown), as do first and second communication lines (225, 230) and pilot return and pilot lines (235, 240) for connection to their respective contacts (not shown). The thermostat 245 may be housed in the first electrical connector 200 to monitor the internal temperature of the electrical connector to determine whether it surpasses a first temperature threshold. The thermostat 245 may be electrically coupled between the pilot return line 235 and pilot line 240 through connector wires (255, 260, respectively) to reduce the voltage between the pilot return line 235 and pilot line 240, such as by shorting, if the thermostat 245 is tripped by a temperature that approximately meets or exceeds the first temperature threshold. In one embodiment, a second thermostat 250 may be connected in parallel with the first thermostat 245 to provide for system redundancy so that if one thermostat fails, the other thermostat is available.

In one non-limiting example, the thermostat is a normally-open thermostat 245 model THERMOSTAT 140 DEG C NO 2SIP offered by Cantherm of Montreal, Canada, that is rated to close at approximately 140° C. Consequently, if the thermostat 245 measures a temperature that meets or exceeds approximately 140° C., the thermostat 245 will trigger (i.e., close), thus shorting the pilot return and pilot lines (235, 240) together to provide a thermal overload alarm indication to a connected battery charger (or battery monitor) that is monitoring the pilot level (i.e., voltage) of the pilot return and pilot lines (235, 240). This thermal overload alarm indication may be used by the connected battery charger to reduce or cease power provided to the first and second power lines (215, 220) to reduce or cease heating in the connector 200 that may be caused by faulty contacts of the connector 200 or its mating connector 210.

Although illustrated schematically, the thermostat 245 may be disposed in the electrical connector and electrically coupled to the pilot return and pilot lines using connector wires. In a non-preferred embodiment, the thermistor may be coupled to an exterior of the power connector and electrically coupled between the pilot return line 235 and the pilot line 240.

Although the first electrical conductor 200 is illustrated in FIG. 2 as a charger cable electrical connector, in other embodiments the first electrical conductor 200 and thermostat 245 may be utilized in other locations or for other applications such as for use as connectors on a battery monitoring cable (see 115a, FIG. 1), other ends of adapter or charging cables (110, 115b, FIG. 1) or for any of those connectors 120 illustrated in FIG. 1 with suitable configuration changes for its contacts (i.e., male versus female connectors). For example, the thermostat 245 and associated connector wires (255, 260) may be used, not in the first connector 200, but in the second electrical connector 210 for electrical connection between the pilot return and pilot lines (265, 270). Similarly, the first electrical conductor 200 and internal thermostat 2 . . . 45 may be coupled to a battery charger port or a battery monitor port should those devices include the feature of detachable power and signal cabling.

FIGS. 3 and 4 are schematic diagram and front connector plan views, respectively, illustrating communication and pilot lines and their associated pin-outs in one embodiment of a connector for use with a thermostat for detection and mitigation of excessive internal electrical connector temperature. Direction and data communication lines (300, 305) that carry signaling intended for use between a battery charger and battery monitor may be electrically connected to respective pins 1 and 2 of a connector 400. Similarly, pilot line 310 and pilot return line 315 intended for feedback and control of a battery charger power output may be connected to respective pins 3 and 4 of the connector 400. Connected across the pilot line 310 and pilot return line 315 at pins 3 and 4 is a normally-closed thermostat 320 that may short pins 3 and 4 should the temperature measured at that thermostat 320 exceed a first predetermined temperature. The pins 1, 2, 3, and 4 extend from a front face 405 of the connector for receipt by a female connector (not shown).

In an alternative embodiment, direction and data lines (300, 305) may be replaced with a thermistor (325, 330) that is responsive to temperature changes along its length for communication to a battery charger or battery monitor. In is embodiment, the thermistor (325, 330) would enable detection and mitigation of excessive cabling temperatures, including internal electrical connector temperatures. In further embodiments, the pilot and pilot return lines (310, 315) may function merely as continuity detection lines to detect whether the pins (3, 4) have been decoupled from their mating connectors and so continuity between them has been lost.

FIGS. 5 and 6 are top and bottom plan reviews, respectively, of one embodiment of a partially assembled connector (outer housing removed) 500 showing physical placement and electrical connection of the thermostat illustrated in FIGS. 3 and 4. The thermostat 325 may be physically disposed on a top 505 of the partially assembled connector 500 between the communication data line 305 and the pilot return line 320 and adjacent their respective contacts (510, 515). Connector leads (520, 525) electrically connect the thermostat 325 across the pilot return line 320 at its connector 515 and the pilot line 315 at its connector 600. Although illustrated on a top 505 of the partially assembled connector 500, in other embodiments, the thermostat 325 may be physically located on a bottom surface 605. In embodiments where first and second thermostat are used, one thermostat may be on the top surface 505 while the second thermostat may be on the bottom surface 605. Alternatively, both first and second thermostats may be on either the top surface 505 or on the bottom surface 605 as physical design constraints permit. In further non-preferred embodiments, either one or both of the first and second thermostats may be located on an exterior surface of a connector housing (not shown) or on the connector front face 400 and recessed in a thermostat recess (not shown).

FIG. 7 is a block diagram of a battery charger electrically coupled to a battery monitor and battery, and with a thermostat in only one electrical connector of a power charger cable assembly. A battery charger 700 may be in electrical communication with a charger electrical connector 702 through a charger cable 704 (collectively referred to as the power charger cable assembly) that has power, communication, and pilot lines (not shown). Embedded in an interior of the charger electrical connector 702 may be a thermostat 706 that monitors the internal temperature of the charger electrical connector 702. In embodiments, the thermostat 706 may be (1) electrically coupled across pilot and pilot returns lines to reduce a voltage between them in response to measuring an internal temperature exceeding a first threshold, (2) electrically coupled in series with one of the pilot and pilot return lines to open in response to measuring an internal temperature exceeding a first threshold, or (3) may be connected across power lines and in series with an over-temperature alarm circuit such that, in response to measuring an internal temperature exceeding a first threshold, the thermostat is triggered (i.e., closes) and allows power to flow through the over-temperature alarm circuit.

The charger electrical connector 702 is in electrical communication with an adapter cable 708 through a first adapter cable electrical connector 710, with the adapter cable 708 having a second adapter electrical connector 712 for electrical communication with a battery monitor electrical connector 714. The adapter cable 708 and its connectors (710, 712) may collectively be referred to as an adapter cable assembly. A battery 716 and a battery monitor 718 are in electrical communication with the battery electrical connector 714 through a battery cable 720 (collectively referred to as the battery cable assembly) to receive power and data communication from the battery charger 700, respectively.

The charger electrical connector 702 having the embedded thermostat 706 may be in sufficient thermal communication with the first adapter cable electrical connector 710 through their associated electrical male and female contacts (not shown) such that excessive heat produced between the connectors (702, 710) or within the first adapter cable electrical connector 710 itself by an electrical failure may be conducted to and into the battery charger electrical connector 702 for detection and monitoring by the embedded thermostat 706. In this configuration, even though internal thermostat 706 may be in a first electrical connector 702, its operable to monitor the adjacent mating connector (first adapter cable electrical connector 710) for excessive heat, too.

In an alternative embodiment, the thermostat 706 may be omitted and a thermistor 725 having source and return lines (730, 725) (indicated by dashed lines) connected to either the battery charger 700 or to the battery monitor 718 or to both and encompassed by the power cables (704, 708, 720) to monitor the temperature of the power cables (704, 708, 720) and their associated electrical connectors (702, 710, 712, 714). If the thermistor measures a temperature in excess of a first threshold, such as may be found if the thermistor 725 indicates a temperature in excess of 140° C. somewhere along its length, either the battery charger 700 or battery monitor 718 may provide an over temperature warning to a user. For example, the over-temperature warning may include text messaging of the over-temperature event, recording of the event in an event monitoring log, emailing of the over-temperature event to a user, or display indicative of the over-temperature event on a user interface. In one embodiment, upon the thermistor measuring a temperature in excess the first temperature threshold, or alternatively a temperature in excess of a second temperature threshold, the battery charger responds by reducing or switching off charging power to the charging cable 704.

Figure 8:
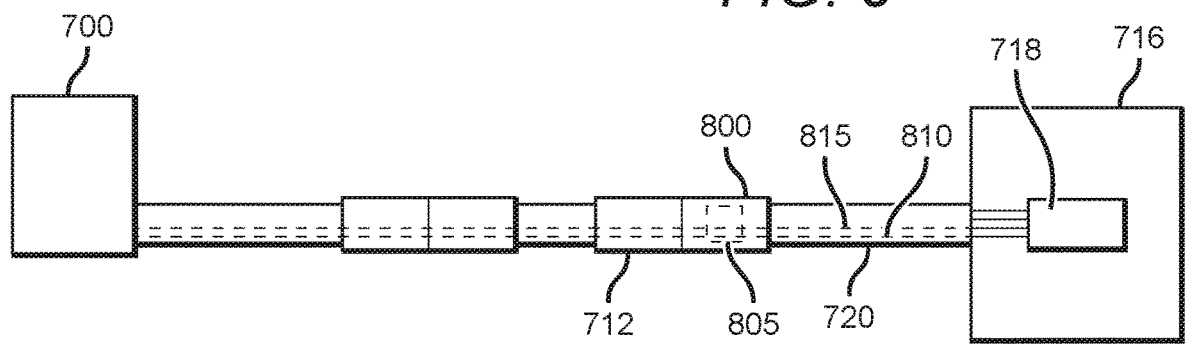
FIG. 8 is a block diagram of a battery charger electrically coupled to a battery monitor and battery, and with a thermostat in a connector of the battery cable assembly.

FIG. 8 is a block diagram of the charger 700, battery monitor 718, and battery 716 first illustrated in FIG. 7, but having a single thermostat in the battery cable assembly rather than in the battery charger cabling assembly. The battery electrical cable 720 may be in communication with the battery 716 and battery monitor 718 through the battery cable 720. Embedded in an interior of the connector 800 may be a thermostat 805 to monitor the internal temperature of the battery electrical connector 800. In embodiments, the thermostat 805 may be (1) electrically coupled across pilot and pilot returns lines to reduce a voltage between them in response to measuring an internal temperature exceeding a first threshold, (2) electrically coupled in series with one of the pilot and pilot return lines to open in response to measuring an internal temperature exceeding a first threshold, or (3) may be connected across power lines and in series with an over-temperature alarm circuit such that, in response to measuring an internal temperature exceeding a first threshold, the thermostat is triggered (i.e., closes) and allows power to flow through the over-temperature alarm circuit.

The thermostat 805 may be in thermal communication with the second adapter electrical connector 712 so that such that excessive heat produced between the electrical connectors (800, 712) or within the first adapter cable electrical connector 712 itself by an electrical failure may be conducted to and into the battery electrical connector 800 for detection and monitoring by the embedded thermostat 805.

In an alternative embodiment that does not use battery charging control in response to pilot line and pilot return line voltage, the pilot line and pilot return line may be functionally replaced with continuity lines (810, 815), and the thermostat 805 may be (1) electrically coupled across the continuity lines (810, 815) to short them together in response to measuring an internal temperature exceeding a first threshold or (2) electrically coupled in series with one of the continuity lines to open them (i.e., break signal connection) in response to measuring an internal temperature exceeding a first threshold. In response, the battery charger 700 switch off charging current to the charging cable 704. Alternatively, the battery monitor 718 may provide an over-temperature warning to a user. For example, the over-temperature warning may include text messaging of the over-temperature event, recording of the event in an event monitoring log, emailing of the over-temperature event to a user, or display indicative of the over-temperature event.

Figure 9:
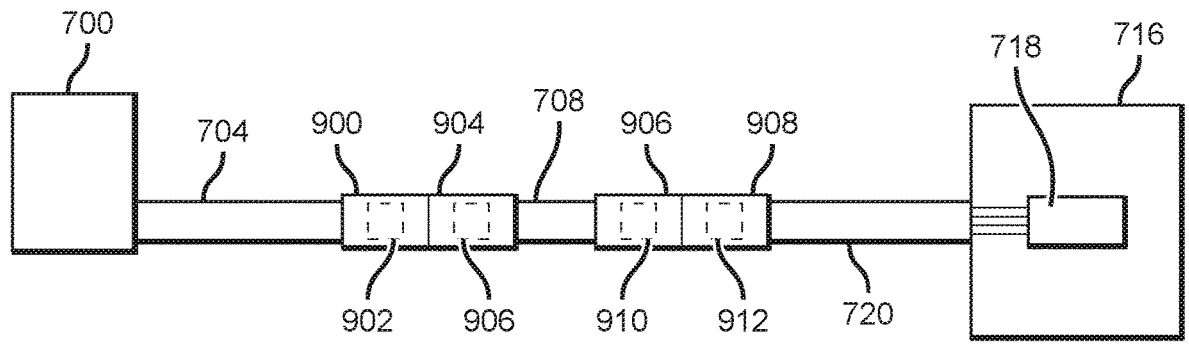
FIG. 9 is a block diagram of a battery charger electrically coupled to a battery monitor and battery, and with thermostats in each connector of the battery cable assembly, adapter cable assembly and battery charger assembly.

FIG. 9 is a block diagram of the battery charger 700, battery monitor 718, and battery 716 first illustrated in FIGS. 7 and 8, but having thermostats in each connector of the battery cable assembly, adapter cable assembly and battery charger assembly. The battery charger 700 may be in electrical communication with a charger electrical connector 900 through the charger cable 704, with the charger electrical connector 900 having a thermostat 902 coupled to an interior of the connector 900 adjacent the connector's associated electrical contacts to monitor the internal temperature of the charger electrical connector 900 and its associated contacts. The charger electrical connector 900 is in electrical communication with an adapter cable 708 through a first adapter cable electrical connector 904 that has an embedded thermostat 906 to monitor the internal temperature of the charger first adapter cable electrical connector 904. The adapter cable 708 may have a second adapter electrical connector 906 in electrical communication with a battery monitor electrical connector 908, each of which may have embedded thermostats (910, 912, respectively) The battery 716 and the battery monitor 718 are in electrical communication with the battery electrical connector 908 through the battery cable 720 to receive power and data communication from the battery charger 700, respectively. In the embodiment illustrated in FIG. 9, each of the thermostats (902, 906, 910, 912) may be (1) electrically coupled across pilot and pilot returns lines to reduce a voltage between them in response to measuring an internal temperature exceeding a first threshold, (2) electrically coupled in series with one of the pilot and pilot return lines to open in response to measuring an internal temperature exceeding a first threshold, or (3) may be connected across power lines and in series with an over-temperature alarm circuit such that, in response to measuring an internal temperature exceeding a first threshold, the thermostat is triggered (i.e., closes) and allows power to flow through the over-temperature alarm circuit.

In a further embodiment, a continuous temperature sensor, such as a thermistor (not shown), may be provided along the complete current path (704, 900, 904, 708, 906, 908, 720) to monitor the path for unexpected or damaging temperature levels. In response to a detected over-temperature condition, such as a thermistor-measured temperature somewhere along the complete current path in excess of 140° C., the pilot voltage may be reduced and/or the battery charger may reduce the current provided to the path in an effort to reduce the possibility of catastrophic connector failure and an associated battery fire.

FIG. 10 is a block diagram and schematic of one embodiment of multiple thermostats connected between pilot and pilots return lines to provide stepped responses to an over-temperature condition in an electrical connector. A first electrical connector 1000, such as a charger cable connector configured as a male euro connector, may be coupled to a second electrical connector 1010, such as an adapter cable connector (alternatively referred to as a maintenance cable connector) configured as a female euro connector on a euro-to-SB350 adapter cable. First and second power lines (1015, 1020) extend into the charger cable electrical connector 1110 for electrical connection to respective power contacts (not shown), as do first and second communication lines (1025, 1030) and pilot return and pilot lines (1035, 1040) for connection to their respective contacts (not shown). A first normally-open thermostat 1045 may be electrically connected in series with a first thermostat resister 1050 in the first electrical connector 1100, with the first thermostat 1045 monitoring the internal temperature of the electrical connector to determine whether the interior surpasses a first temperature threshold. The first thermostat 1045 and first thermostat resister 1050 may be electrically connected across the pilot return line 1035 and pilot line 1040 through connector wires (1055, 1060, respectively) to reduce the voltage between the them (1035, 1040) if the thermostat is tripped by a temperature that meets or exceeds the first temperature threshold.

Additional functionality may be provided in another embodiment, where a second normally-open thermostat 1065 may be electrically connected between the pilot return line 1035 and pilot line 1040 through the connector wires (1055, 1060, respectively) and set to trigger at a second temperature threshold. For example, in response to measuring an internal temperature of the electrical connector 1000 that meets or exceeds a second temperature threshold, the thermostat may trigger (i.e., "close") to reduce the voltage across the pilot return line 1035 and pilot line 1040, such as with an electrical short. The second temperature threshold is preferably greater than the first temperature threshold.

In a further embodiment, an additional set of thermostats may be provided in parallel with the pilot return line 1035 and pilot line 1040 to provide system redundancy for the first and second thermostats (1045, 1065). For example, a normally-open third thermostat 1070 may be electrically connected in series with a second thermostat resistor 1075 for connection between the pilot return line 1035 and the pilot line 1040, with the third thermostat 1070 rated to trigger at approximately the same first temperature threshold as that of the first thermostat 1045 for system redundancy. Similarly, a fourth thermostat 1080 may be electrically connected across the second thermostat 1065, and in electrically connected between with the pilot return line 1035 and pilot line 1040. The fourth thermostat 1080 may be designed to close at approximately the same second temperature threshold as that of the second thermostat 1065 for system redundancy.

The first, second, third and fourth thermostats (1045, 1065, 1080, 1070) and first and second thermostat resistors may collectively be referred to as a thermostat first connector thermostat 1085 that has the features of reducing the voltage between the pilot return line 1035 and pilot line 1040 at a first temperature threshold, and shorting the the pilot return line 1035 and pilot line 1040 at a second (and higher) temperature threshold. A connected battery charger or battery monitor (each not shown) may interpret the change in voltage between the pilot return line 1035 and pilot line 1040 as an indication of excessive heat in the connector 1000 or its mating connector 1010 to first warn a user as the temperature meets or exceeds the first temperature threshold, and to then cut power to the power lines as the temperature meets or exceeds the second temperature threshold.

FIG. 11 is a block diagram and schematic illustrating use of the first connector thermostat first illustrated in FIG. 10, and with a second thermostat used to measure the internal temperature of the adjacent mating connector. The first connector thermostat 1085 may be coupled between the pilot return line 1035 and pilot line 1040 through the connector wires (1055, 1060, respectively) to first reduce the voltage between the pilot return line 1035 and the pilot line 1040 at a first temperature threshold and to electrically short them (1035, 1040) at a second temperature threshold that is higher than the first temperature threshold. The mating connector 1103 may also have a thermostat 1105 disposed in an interior of the electrical connector 1103 and electrically connected across the pilot return line 1035 and pilot line 1040. The thermostat 1105 may consist of a single thermostat 1110 connected across the pilot return line 1035 and pilot line 1040 through connector traces (1115, 1120, respectively). The thermostat 1105 may be configured to trigger at the same threshold temperature as that designed for the second normally-open thermostat 1065 and/or the redundant third thermostat 1070 (which each function to short the pilot return line 1035 and pilot line 1040). In an alternative environment, the single thermostat 1110 may be configured to trigger at a third threshold temperature that is different from the first and second threshold temperatures. In a further embodiment, a thermostat resistor (not shown) may be electrically connected in series with the single thermostat 1110 to reduce the voltage between the pilot return line 1035 and pilot line 1040 but without completely shorting them together.

FIGS. 12 and 13 are schematic diagram and front connector plan views, respectively, illustrating use of a normally-closed thermostat in series with a pilot line for detection and mitigation of excessive internal electrical connector temperature. Direction and data communication lines (1200, 1205) may be electrically connected to respective pins 1 and 2 of a connector 1300. Similarly, a pilot line 1210 and a pilot return line 1215 may be connected to respective pins 3 and 4 of the connector 1300. Connected in series with the pilot line 1210 at pin 3 may be a normally-closed thermostat 1225 that may electrically short pins 3 and 4 should the temperature measured at that thermostat 1225 exceed a first predetermined temperature. The pins 1, 2, 3, and 4 may extend from a front face 1305 of the connector for receipt by a female connector (not shown).

Figure 14:
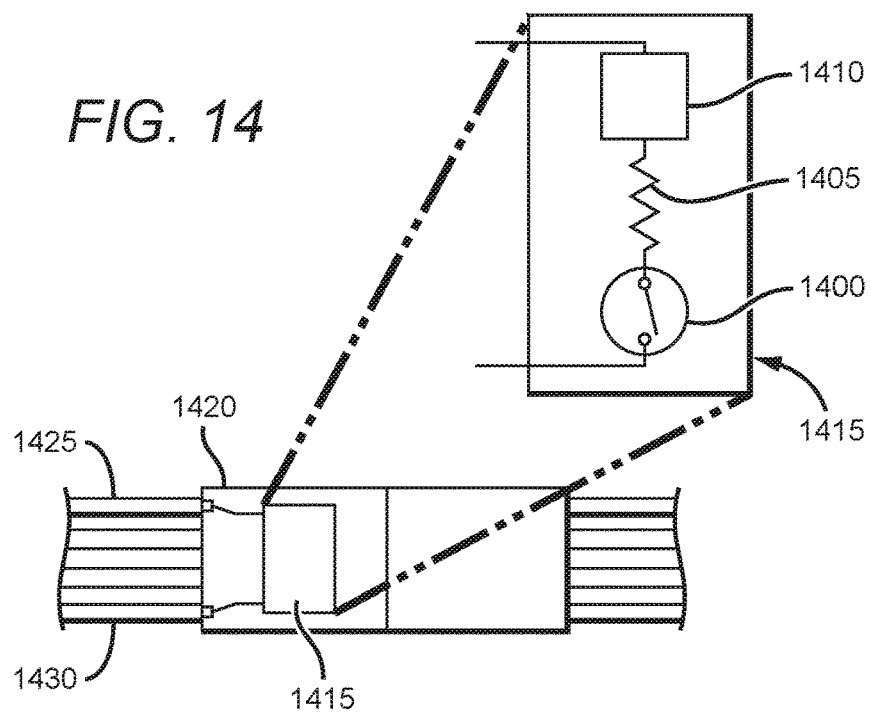
FIG. 14 is a block diagram and schematic of one embodiment of a thermostat housed in an electrical connector and connected in series with an alarm.

FIG. 14 is a block diagram and schematic of one embodiment of a thermostat housed in an electrical connector and connected in series with an alarm to provide notice to a user of an over-temperature condition in an electrical connector or in an adjacent mating connector. The normally-closed thermostat 1400 may be electrically connected in series with a thermostat resistor 1405 and an alarm 1410 to define an alarmed thermostat 1415. The alarmed thermostat 1415 may be disposed in an interior of an electrical connector 1420, with the alarmed thermostat 1415 electrically connected between first and second power lines 1425 and 1430. Upon triggering, the thermostat 1400 may complete a circuit between the first and second power lines 1425 and 1430, thus powering the alarm 1410 that may be an audible alarm, a light source such as an LED to illuminate the connector, or a transceiver for wireless communication of the over-temperature condition to an exterior alarm receiver (not shown), or other transmitter for the over-temperature condition. The alarm may be disposed in an interior of the electrical connector 1420 or exterior to the electrical connector 1420, such as on an exterior of the electrical connector's housing (not shown).

Figure 15:
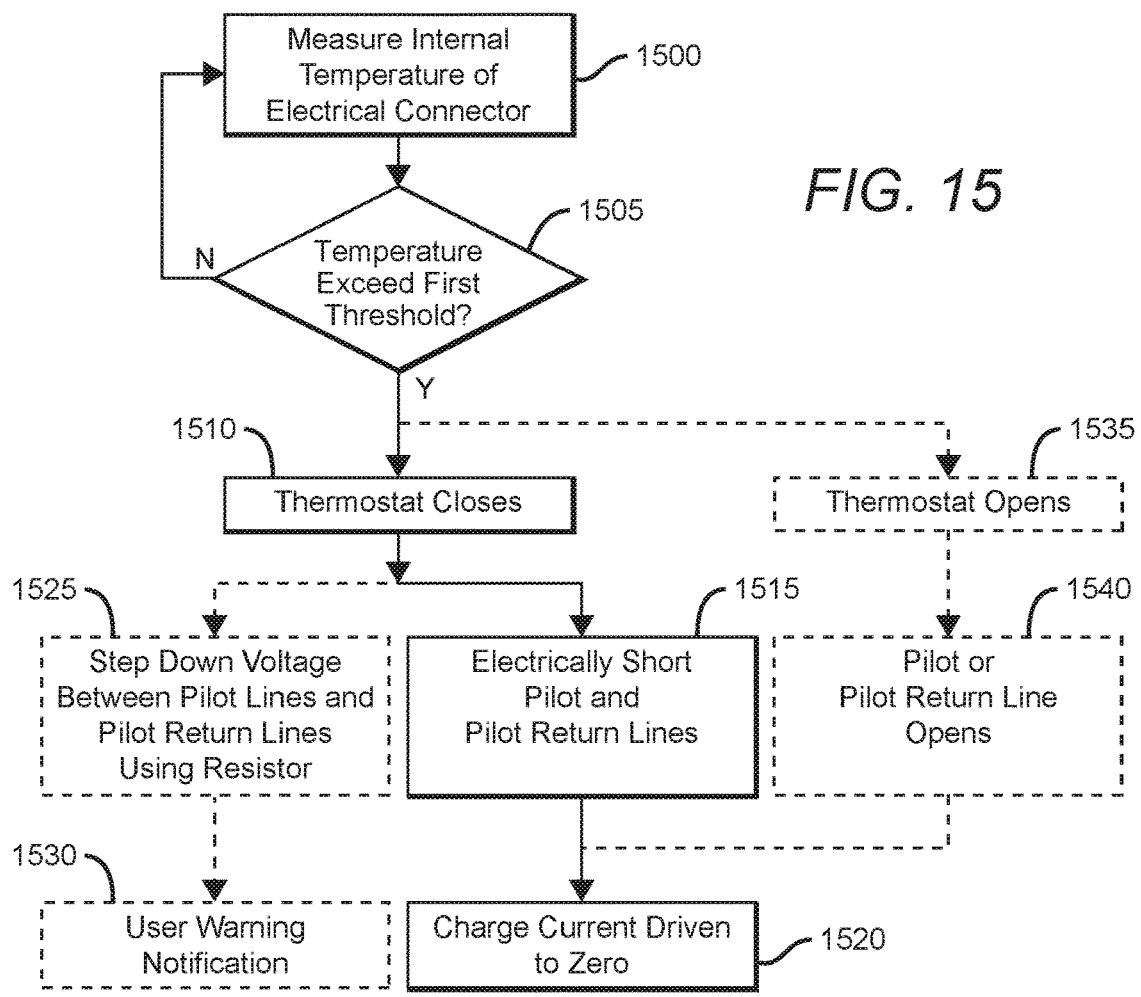
FIG. 15 is a functional block diagram illustrating the steps of identifying and mitigating excessive heat detected within an electrical connector used in an EV battery charging system that has power lines, a pilot line and pilot return line.

FIG. 15 is a functional block diagram illustrating the steps of identifying and mitigating excessive heat detected within an electrical connector used in an EV battery charging system that has power lines, a pilot line and pilot return line. An internal temperature of an electrical conductor is measured (block 1500), such as with a normally-open thermostat embedded within a housing of the electrical connector. Preferably, the thermostat may be disposed adjacent to electrical contacts of the electrical connector within the housing. If the thermostat measures an internal temperature that exceeds a first threshold (block 1505), such as 140° C., the thermostat may close (block 1510) and the pilot and pilot return lines electrically shorted (block 1515). In response, an associated battery charger may drive or otherwise switch current in the connector's power lines to zero (block 1520) to reduce the possibility of catastrophic failure of such connector due to excessive heat caused by current flowing through a potentially defective electrical contact in, adjacent to or used by the electrical connector. In an alternative embodiment, thermostat closure (block 1510) results in voltage between the pilot line and pilot return line being stepped down using a resistor (block 1525), and in response the associated battery charger (or a battery monitor) may provide a user with a warning notification of the over temperature condition in the electrical conductor. In embodiments, the warning notification may take the form of an audible alarm, a visual cue such as an LED illuminating on exterior casing of the electrical conductor (or otherwise visible through a housing of the electrical conductor) or may take the form of an alarm signal sent by a transceiver or transmitter in communication with the thermostat intended for receipt by an external receiver that may then communicate the over-temperature alarm to a user.

In the further embodiments, if the internal temperature of the electrical conductor exceeds the first threshold (block 1505), rather than closing a thermostat (block 1510), a thermostat in series with either the pilot or pilot return line may open (block 1535) resulting in a signal break in the pilot or pilot return line (block 1540) for detection by a battery charger (or battery monitor). In response, the battery charger may reduce or otherwise cease power provided through the associated power lines coupled to the electrical connector with the intent of reducing excessive heat potentially caused by current flowing one or more defective electrical contacts of the electrical connector.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

We claim:

1. A method of electric vehicle (EV) electrical connector monitoring, comprising:
   monitoring a temperature of an electrical connector via a temperature sensor circuit disposed within the electrical connector, the electrical connector having a pilot line and a pilot return line, and the temperature sensor circuit connected between the pilot line and the pilot return line;
   reducing a first voltage between the pilot line and the pilot return line to a second voltage in response to the monitored temperature exceeding a first threshold, wherein the first voltage is reduced via the temperature sensor circuit;
   reducing charging current provided on a power line through the electrical connector in response to the reduction in the first voltage; and
   reducing the second voltage between the pilot line and the pilot return line to a third voltage in response to the monitored temperature exceeding a second threshold, wherein the second voltage is reduced via the temperature sensor circuit.

2. The method of claim 1, wherein the step of reducing the charging current comprises stopping the charging current.

3. The method of claim 1, wherein the step of changing the voltage between the pilot line and the pilot return line comprises electrically shorting the pilot line and the pilot return lines together via the temperature sensor circuit.

4. The method of claim 1, wherein the temperature sensor circuit comprises a thermistor.

5. The method of claim 1 further comprises opening a switch that is electrically connected in series with either one of the pilot line or pilot return line.

6. The method of claim 1, wherein the temperature sensor circuit comprises a resistor connected in series with a thermostat, and wherein the thermostat is triggered at the first threshold temperature to reduce the voltage between the pilot line and the pilot return line.

7. The method of claim 1, further comprising:
   generating a cessation of power request signal provided to the electrical connector in response to the further reduction of the voltage between the pilot line and the pilot return line.

8. The method of claim 1, wherein the reducing the second voltage comprises electrically shorting the pilot line and the pilot return line together.

9. The method of claim 1, wherein the reducing the second voltage comprises opening a switch disposed in series with one of the pilot line and the pilot return line.

10. A method of protecting an EV charger connector from excessive heat, comprising:
    monitoring a temperature of an electrical connector via a temperature sensor circuit disposed within the electrical connector, wherein the temperature sensor circuit is connected between a pilot line and a pilot return line;
    reducing a first voltage between the pilot line and the pilot return line to a second voltage in response to the monitored temperature exceeding a first threshold, wherein the first voltage is reduced via the temperature sensor circuit;
    switching on an over-temperature alarm circuit in response to the reduction in the first voltage between the pilot line and the pilot return line;
    wherein the internal temperature exceeding the first threshold will result in an alarm indication from the over-temperature alarm circuit;
    reducing the second voltage between the pilot line and the pilot return line to a third voltage in response to the monitored temperature exceeding a second threshold, wherein the second voltage is reduced via the temperature sensor circuit.

11. The method of claim 10, wherein the switching on the over-temperature alarm circuit comprises tripping a thermostat.

12. The method of claim 10, wherein the over-temperature alarm circuit comprises an LED light encompassed by the electrical connector.

13. A battery monitoring apparatus, comprising:
    first and second pilot lines in an electrical connector;
    first and second power lines in the electrical connector; and
    a temperature sensor circuit disposed within the electrical connector, wherein the temperature sensor circuit is electrically coupled to the first pilot line and the second pilot line, wherein the temperature sensor circuit reduces a first voltage between the first and second pilot lines to a second voltage in response to a monitored temperature measured by the temperature sensor circuit exceeding a first threshold, and wherein the temperature sensor circuit reduces the second voltage between the first and second pilot lines to a third voltage in response to the monitored temperature measured by the temperature sensor circuit exceeding a second threshold.

14. The apparatus of claim 13, wherein the temperature sensor circuit comprises a thermistor.

15. The apparatus of claim 13, wherein the temperature sensor circuit comprises a resistor connected in series with a thermostat.

16. The apparatus of claim 13, further comprising an excessive heat alarm.

17. The apparatus of claim 13, wherein the thermostat is electrically coupled between the first and second power lines and the thermostat is a normally-open thermostat.

18. The apparatus of claim 13, further comprising:
    a thermal alarm connected in series with the temperature sensor circuit.

19. The apparatus of claim 18, further comprising:
    a second temperature sensor circuit electrically coupled between the first and second pilot lines and configured to close in response to the temperature exceeding the second threshold.

20. The apparatus of claim 19, wherein power to at least one of the first and second power lines is switched off in response to closing of the second temperature sensor circuit across the first and second pilot lines.

* * * * *